United States Patent [19]

Yeager et al.

[11] Patent Number: 5,189,191
[45] Date of Patent: Feb. 23, 1993

[54] FREE-RADICAL GENERATING AROMATIC DIOLS, POLYCARBONATES CONTAINING THERMAL LABILE GROUPS AND THEIR CONVERSION TO POLYCARBONATE BLOCK COPOLYMERS

[75] Inventors: Gary W. Yeager, Schenectady; James V. Crivello, Clifton Park, both of N.Y.

[73] Assignee: General Electric Company, Schenectady, N.Y.

[21] Appl. No.: 883,733

[22] Filed: May 15, 1992

Related U.S. Application Data

[62] Division of Ser. No. 756,711, Sep. 9, 1991, Pat. No. 5,140,078.

[51] Int. Cl.$^5$ .................................................. C07F 7/18
[52] U.S. Cl. ...................................................... 556/443
[58] Field of Search .......................................... 556/443

[56] References Cited

U.S. PATENT DOCUMENTS

| | | | |
|---|---|---|---|
| 2,611,783 | 9/1952 | Speier | 556/443 |
| 3,510,507 | 5/1970 | Bown et al. | 556/443 X |
| 3,595,974 | 7/1971 | Sloyl et al. | 556/443 X |
| 4,288,603 | 9/1981 | Stark | 556/443 X |
| 4,535,174 | 8/1985 | Crivello | 556/443 |

*Primary Examiner*—Paul F. Shaver
*Attorney, Agent, or Firm*—William A. Teoli; William H. Pittman

[57] ABSTRACT

Bisphenols containing free-radical generating groups, such as bissilylpinacolate groups, are provided. These bisphenols can be used to make free-radical generating polycarbonate macroinitiators having thermally labile groups which can be heated with vinyl monomers, such as styrene to make polycarbonate block copolymers.

1 Claim, No Drawings

FREE-RADICAL GENERATING AROMATIC DIOLS, POLYCARBONATES CONTAINING THERMAL LABILE GROUPS AND THEIR CONVERSION TO POLYCARBONATE BLOCK COPOLYMERS

This application is a division of application Ser. No. 756,711, filed Sep. 9, 1991, now U.S. Pat. No. 4,140,078.

CROSS REFERENCE TO RELATED APPLICATIONS

Reference is made to copending application Ser. No. 07/404,287, filed Sep. 7, 1989 for Peroxide Terminated Polycarbonates, Preparation Thereof and Conversion to Copolymers, which is incorporated herein by reference.

BACKGROUND OF THE INVENTION

The present invention relates to the use of free-radical generating aromatic diols for preparing polycarbonates having thermal labile free-radical generating groups in the backbone. More particularly, the present invention relates to the employment of free-radical polymerizable organic monomers, such as styrene in combination with polycarbonates having thermally labile free-radical generating groups to produce polycarbonate block copolymers upon thermolysis.

Prior to the present invention, as shown by Crivello, U.S. Pat. Nos. 4,484,332 and 4,677,169, silicone-organic block copolymers were provided by heating a mixture of a silicone prepolymer having chemically combined pinacolate groups and a free-radical polymerizable organic monomer, such as styrene, to produce silicone-organic block copolymers.

As discussed in copending application 07/404,287, polycarbonate block copolymers can be made by the reaction of a peroxide terminated polycarbonate with an ethylenically unsaturated compound, such as styrene, to produce the corresponding polycarbonate-polystyrene block copolymer. The resulting copolymers have been found capable of compatabilizing blends of a polycarbonate with another organic polymer.

SUMMARY OF THE INVENTION

The present invention is based on the discovery that a free-radical generating aromatic diol having the formula,

HO—R—Q—R—OH,     (1)

where R is a divalent $C_{(6-13)}$ aromatic organic radical, and Q is a divalent thermally labile free-radical generating group as defined below, can be phosgenated together with bisphenols, such as bisphenol-A, to provide polycarbonates having free-radical generating capability upon thermolysis. As a result, polycarbonate block copolymers can be spontaneously formed by the chain growth at both ends of the macrodiradicals which are produced by the thermal decomposition of the thermally labile residues of the polycarbonate. A variety of polycarbonate block copolymers can be prepared utilizing this method of synthesis in view of the wide variety of vinyl monomers which can be used.

STATEMENT OF THE INVENTION

There is provided by the present invention polycarbonate block copolymers comprising polycarbonate blocks and organic polymeric blocks substantially free of chemically combined carbonate units, which polycarbonate block copolymers comprise the reaction product of free-radical polymerizable organic monomer and a polycarbonate macroinitiator having in its backbone, or in its terminal position, at least one chemically combined thermally labile group capable of forming free-radicals upon thermolysis.

Aromatic organic radicals included by R of Formula 1 are $C_{(6-13)}$ divalent aromatic organic radicals, such as phenylene, tolylene, xylene, and naphthalene; divalent groups included within Q of Formula 1 are, for example,

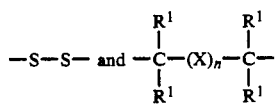

where X is a member selected from N—N and —O—O—, $R^1$ is the same or different $C_{(1-13)}$ monovalent organic radical, such as methyl or phenyl, and n is 0 or 1.

Some of the aromatic diols included within Formula 1 are, for example,

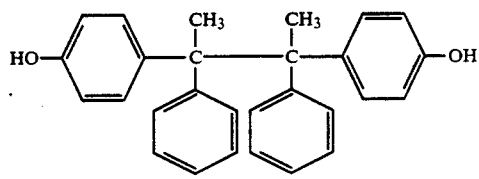

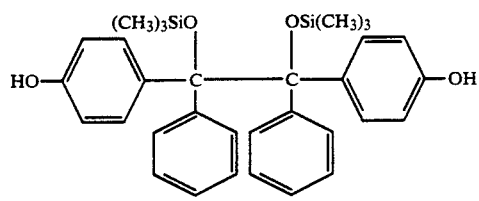

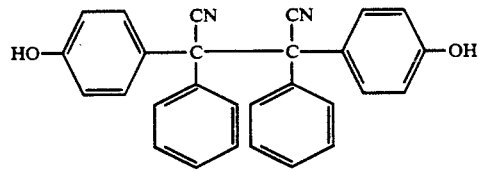

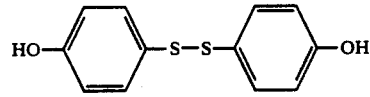

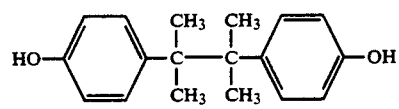

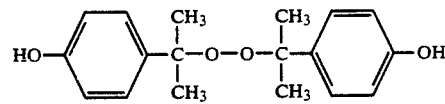

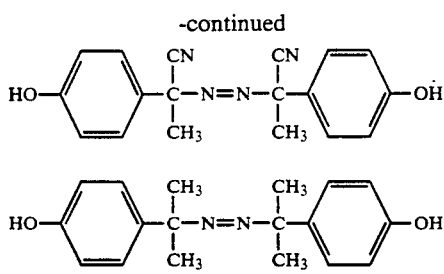

Polycarbonates having thermally labile groups in their backbone, can be made by phosgenating a mixture of a free-radical generating aromatic diol included within Formula 1, and a dihydric phenol included within the formula $$HOR^2OH \qquad (2)$$

where $R^2$ is a $C_{(6-13)}$ divalent aromatic hydrocarbon radical. Dihydric phenols included within formula (2) are, for example, 2,2-bis-(2-hydroxyphenyl)propane, 2,4'-dihydroxybiphenylmethane, bis-2(2-hydroxyphenyl)methane, 2,2-bis-(4-hydroxyphenyl)propane, referred to hereinafter as "bisphenol A" or "BPA", 1,1-bis(4-hydroxyphenyl)ethane, 1,1-bis(4-hydroxyphenyl)propane, 4,4'-dihydroxybiphenyl, 4,4'-dihydroxy-3,3',5,5'-tetramethylbiphenyl, 2,4-dihydroxybenzophenone, 4,4'-dihydroxydiphenylsulfone, 2,4'-dihydroxydiphenylsulfone, 4,4'-dihydroxydiphenylsulfoxide, 4,4'-dihydroxydiphenylsulfide, tetramethyl bisphenol,1, 1,1-dichloro-2, 2-bis(4-hydroxyphenyl) ethylene, 6,6'-dihydroxy-3,3,3',3'-tetramethyl-bis-,1,1'spiroindane, oxydiphenol, 4,4'-[1,4-phenylenebisoxy]bisphenol,

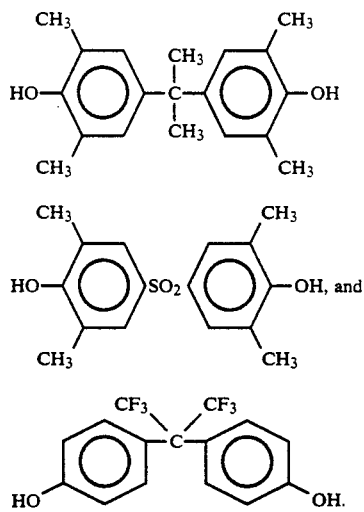

The polycarbonates having free-radical generating Q groups of formula 1, in the backbone referred to hereinafter the "polycarbonate macroinitiator" or "macroinitiator" can have a $M_n$ of 1000 to 1,000,000 and an $M_w$ of 2,000 to 1,000,000 grams/mols along with a dispersity of a 1.5 to 10 as determined using polystyrene standards. [1] HNMR spectroscopy shows that there can be from 0.5 to 20 mol % of Q groups in the polycarbonate backbone.

Suitable free-radical polymerizable monomers or mixtures thereof, which can be coreacted with the macroinitiator are, for example, styrene, 4-methylstyrene, 4-1-butylstyrene, 2-chlorostyrene, 4-bromostyrene, 4chloromethylstyrene, vinyl napthalene, n-vinylcarbazole, vinyl acetate, vinyl anthracene, acrylonitrile, methacrylonitrile, maleic anhydride, ethyl vinyl ether, methyl methacrylate, vinyl pyridine, butyl acrylate, butadiene, isoprene, lauryl acrylate, vinyl carbonate, diethyl maleate, methyl α-cyanoacrylate.

In the practice of the present invention, a macroinitiator can be used to carry out block polymerizations simply by dissolving it into a free-radically polymerizable organic monomer which hereinafter means one or a mixture of several organic monomers as previously defined, in instances where such dissolution can be achieved. Depending upon the mol % of the thermally labile Q groups in the polycarbonate macroinitiator and the weight proportion of the polycarbonate macroinitiator which is used in combination with the free-radical polymerizable organic monomer, the nature of the resulting polycarbonate block copolymer can vary considerably. It is preferred, for example, to utilize polycarbonate macroinitiator having from about 0.5 mol % to 20 mol %, and preferably 1 mol % to 10 mol % of thermally labile Q groups to provide polycarbonate block copolymers upon thermolysis with the free-radical polymerizable organic monomer. On the other hand, depending upon the nature of the polycarbonate block copolymer desired, there can be used from 10 parts to 100 parts by weight of polycarbonate macroinitiator, per 100 parts by weight of the free-radical polymerizable organic monomer.

In particular instances, it has been found advantageous to employ an inert organic solvent in combination with the free-radical polymerizable organic monomer to facilitate the dissolution of the polycarbonate macroinitiator and its coreaction with the free-radical polymerizable organic monomer. Examples of such solvents are, toluene, chlorobenzene, and cyclohexanone.

Temperatures in the range of from 40° C. to 180° C. can be used to effect the thermolysis of the polycarbonate macroinitiator to achieve free-radical polymerization and formation of the polycarbonate block copolymer and preferably temperatures in the range of from 60° C. to 140° C.

The polycarbonate block copolymers of the present invention can be used as compatibilizers for polycarbonate blends with vinyl homopolymers, such as polystyrene, polymethylmethacrylate, polyvinyl chloride, polybutadiene, and the like. They can also compatabilize vinyl copolymers such as styrene-co-butadiene and styrene-acrylonitrile.

In order that those skilled in the art will be better able to practice the present invention the following examples are given by way of illustration and not by way of limitation. All parts are by weight unless otherwise indicated.

EXAMPLE 1

4,4'-dihydroxy-O,O-bis(trimethylsilyl)benzopinacol having the formula,

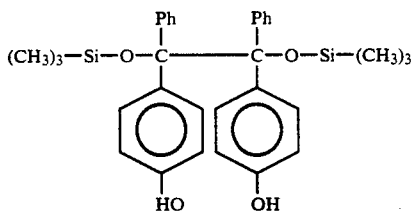

where Ph is phenyl, was prepared as follows:

There was added 105.78 grams(0.50 mol) of N,O-bis(-trimethylsilyl) acetamide over a period of 25 minutes to a stirred solution of 99.1 grams(0.50 mol) of 4-hydroxybenzophenone and 1 liter of tetrahydrofuran. The solution was allowed to stir for one hour under ambient conditions. The solvent was then removed and the resulting oil distilled in vacuo (boiling point 154°–156° C.) to yield 123.01 grams(0.45 mol 90%) of the desired product. Based on the method of preparation and the $^1$H-NMR spectra, the product was 4-(trimethylsilyloxy)benzophenone.

There was added 1.27 grams (0.05 mol) of magnesium metal (30 mesh) and 5mL of N,N,N',N'-tetramethylurea to a stirred solution under ambient conditions containing 27.0 grams of the above 4-(trimethylsilyloxy)benzophenone, 10.86 grams(0.1 mol) of trimethylchlorosilane and 50 mL of tetrahydrofuran. The reaction mixture was heated at reflux for one hour and allowed to stir for an additional 12 hours. The solvent was then removed in vacuo, leaving an oil which was slurried with 200 mL of diethyl ether and filtered. The filtrate was collected and the ether removed in vacuo. The resulting oil was purified by flash chromatography to yield 48.40 grams(84%) of the product. Based on method of preparation and $^1$H-NMR spectrum, the product was a mixture of corresponding d,l and meso stereoisomers of 4,4'-bis(dimethylsilylloxy)-O,O-bis(-trimethylsilyl)benzopinacol.

There was added 50 mL of a 5% aqueous potassium carbonate solution to a stirred solution under ambient conditions containing 46 grams(0.08 mol) of the above benzopinacol and 150 mL of methanol. After 1 hour, a solid precipitated from a reaction mixture and an additional 100 mL of water was slowly added. The reaction was stirred for an additional 3 hours. The product was isolated from solution by filtration and dried in vacuo at room temperature to yield 26.60 grams (69% of product). Based on method of preparation, and $^1$H-NMR spectrum, the product was 4,4'-dihydroxy-O,O-bis(-trimethylsilyl)benzopinacol.

EXAMPLE 2

There was added 5.0 mL of a 0.10M methylene chloride solution of triethylamine to a solution of 11.41 grams(0.05 mol) of bisphenol A and 1.36 grams(0.0025 mol) of the above dihydroxy benzopinacol. The pH of the reaction mixture was increased to 10 by an addition of a few drops of a 50 % by weight aqueous sodium hydroxide solution Phosgene was then passed into the reaction mixture while it was vigorously stirred for 40 minutes at a flow rate of 0.35 grams/minute while the pH was maintained between 9–11 by continuous addition of the sodium hydroxide solution. The reaction mixture was purged with nitrogen and then washed once with 500 mL of a 5% acetic acid solution, and three times with one liter of water. The methylene chloride layer was collected and a product precipitated from the solution by addition to methanol. The precipitated product was filtered and dried overnight in vacuo. Based on the method of preparation and the GPC analysis, there was obtained a polycarbonate having an $M_n$ equal to 34,000, $M_w$ equal to 67,000, and $M_w/M_n$ equal to 1.95. The identity of the product was further confirmed by $^1$H-NMR analysis. The number of benzopinacol repeat groups in the polycarbonate chain was determined to be 4.38, based on GPC analysis.

EXAMPLE 3

A continuous stream of argon was passed into a mechanically stirred solution of 100 mL of styrene and 5 grams of the polycarbonate macroinitiator of Example 3. After a period of 15 minutes, the reaction mixture was heated to 100° C. for a period of 90 minutes in a constant temperature bath. After such time, the solution was removed from the bath, allowed to cool and poured into methanol precipitate product. The product was isolated from solution by filtration, dried overnight at 60° C. in vacuo. The product was then redissolved in chloroform and reprecipitated by addition of methanol. There is obtained 13.5 grams of polymeric product. Based on method of preparation and GPC analysis, the product was a polycarbonate-polystyrene block copolymer having an $M_n$ of 60,515, $M_w$ of 239,298, and $M_w/M_n$ of 3.94.

A three component compatibilized blend is prepared by melt mixing in an extruder at 230°–250° C., 20 parts of the above polycarbonate-polystyrene block copolymer, 50 parts of a polycarbonate resin having an $M_n$ of about 15,000 and an Mw of about 40,000 and 50 parts of a polystyrene resin having an $M_n$ of about 80,000 and an $M_w$ of about 190,000. The melt is allowed to cool and then molded 240° C.–260° C. at 1500 psi.

The molded compatabilized blend is found to have improved interfacial dispersion and impact properties as compared to a molded blend of the same component free of the polycarbonate-polystyrene compatabilizer.

EXAMPLE 4

A continuous stream of argon was passed into a mechanically stirred solution containing 60 ml of chlorobenzene, 3 grams of the polycarbonate macroinitiator of Example 2, and 15.6 grams of styrene. After a period of 15 minutes, the reaction mixture was heated to 100° C. for a period of 8 hours in a constant temperature bath. After such time, the solution was removed from the bath, allowed to cool and poured into methanol to effect the precipitation of the product. The product was isolated from solution by filtration, dried for 48 hours at 80° C. in vacuo. There was obtained 6.02 grams of product. Based on the method of preparation and GPC analysis, the product was a polycarbonate-polystyrene copolymer having an $M_n$ of 21,800, $M_w$ of 76,825, and $M_w/M_n$ of 3 523.

Although the above examples are directed to only a few of the very many variables which can be employed in the practice of the present invention, it should be understood that the present invention is directed to the use of a much broader variety of free-radical generating aromatic diols, dihydric phenols which can be used in combination with such thermally labile group containing aromatic diols, to produce free-radical macropolycarbonate initiators and free-radical polymerizable organic monomers which can be used to product a wide variety of polycarbonate block copolymers.

What is claimed is:

1. The compound 4,4'-dihydroxy-O,O-bis(trimethylsilyl)benzopinacol.

* * * * *